United States Patent Office 2,984,645
Patented May 16, 1961

2,984,645

STABILIZED POLYURETHANE COMPOSITIONS

Guenther K. Hoeschele, Wilmington, Del., assignor to E. I. du Pont de Nemours and Company, Wilmington, Del., a corporation of Delaware No Drawing. Filed Oct. 20, 1958, Ser. No. 768,005

10 Claims. (Cl. 260—45.8)

This invention relates to polyurethane compositions and more particularly to polyurethane compositions which have been stabilized against photodegradation caused by ultraviolet light.

This application is a continuation-in-part of my copending application Serial No. 709,165, filed January 16, 1958, now abandoned.

Polyurethane compositions which have been prepared from various polyols and organic polyisocyanates are useful in a wide variety of applications. It has been found, however, that in certain of these applications where there is a high surface to volume ratio, such as in fibers, films and coatings, the polyurethane compositions are degraded by extended exposure to sunlight; for example, a serious loss in tensile strength occurs. This detrimental feature of photodegradation definitely exerts an adverse influence on customer acceptance of these compositions. It is believed that ultraviolet light of wave lengths in the range of about 3700 A. units causes the observed photodegradation of many polyurethane compositions (although other polyurethane compositions may be more seriously affected by light of longer wave lengths). Heretofore many organic compounds have been disclosed in the art for absorbing ultraviolet radiation. These compounds, however, have not proved to be entirely satisfactory when used with polyurethane compositions, either because they cannot be homogeneously mixed with said compositions or because they only provide a limited measure of protection. It would be highly desirable, therefore, to provide a polyurethane composition which has been stabilized in an improved manner against photodegradation caused by the absorption of ultraviolet light, the evidence of said photodegradation being a decrease in the modulus at 300% extension and the tensile strength at break of films or a decrease in the flexibility of coatings.

It is an object of this invention to provide a novel polyurethane composition. A further object is to provide a novel polyurethane composition which is stabilized against photodegradation caused by ultraviolet light. A still further object is to provide a process for stabilizing those polyurethane compositions which are degraded by light of wave lengths between about 3500–4000 A. Further objects will appear hereinafter.

These and other objects of this invention are accomplished by a polyurethane composition which is stabilized against photodegradation by having incorporated therein (1) one or more of certain 2,2'-dihydroxybenzophenones which have the property of absorbing substantially all wave lengths of ultraviolet light between about 3500 and 4000 A. units and (2) one or more of certain compounds which synergistically promote the effectiveness of said benzophenones. More particularly, this invention concerns a polyurethane composition prepared from an organic polyisocyanate, an organic polyol, and a chain extending agent selected from the group consisting of water, aliphatic polyols, arylene diamines and hydrazine, which has incorporated therein for every 100 parts by weight of said polyurethane: (1) from about 0.1 to 3.0% by weight of a 2,2'-dihydroxybenzophenone selected from the group consisting of

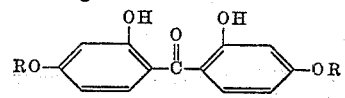

and

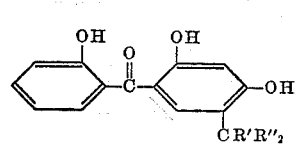

wherein R is hydrogen or lower alkyl, R' is hydrogen or lower alkyl and R'' is lower alkyl, and (2) from about 0.1 to 2.0% by weight of a promoter selected from the group consisting of (a)

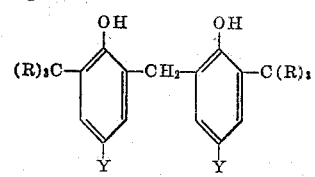

wherein R is hydrogen or a lower alkyl radical and Y is a lower alkyl radical or a phenyl radical;

(b)

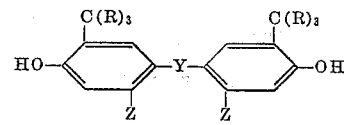

wherein R is a lower alkyl radical, Y is a —S— radical or a lower alkylene radical having the structure

wherein R' is hydrogen or lower alkyl and Z is hydrogen or a lower alkyl radical of no more than 2 carbon atoms;

(c)

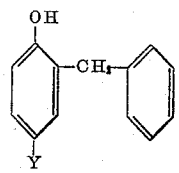

wherein Y is a lower alkyl radical, a phenyl radical or a lower alkyl substituted phenyl radical;

(d)

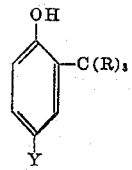

wherein R is a lower alkyl radical and Y is a phenyl radical, a lower alkyl substituted phenyl radical or a —C(R')₃ radical wherein R' is lower alkyl;

(e)

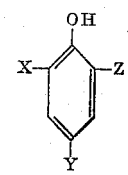

wherein X is a benzyl radical or a

radical wherein R', R'' and R''' are hydrogen or lower alkyl with the proviso that R' and R'' may be alkylene radicals which are joined to form a 5- or 6-membered ring; Y is a phenyl radical or a lower alkyl radical of no more than 2 carbon atoms and Z is a benzyl radical or a

wherein Q' and Q" are hydrogen or lower alkyl, with the proviso that R", R'" and Q' can not all be hydrogen in the same compound;

(f)

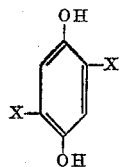

wherein X is hydrogen or lower alkyl;

(g)

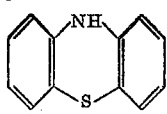

(h)

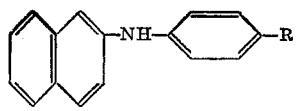

wherein R is hydrogen or a

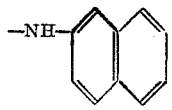

It has been found that this combination of promoters with the 2,2'-dihydroxybenzophenone when incorporated into a polyurethane composition brings about a surprising and completely unexpected synergistic improvement in stabilizing said composition from photodegradation. The use of either the benzophenone or the promoter alone provides only a limited measure of stabilization; however, when they are used in combination in the concentrations specified, a highly significant improvement in stabilization is obtained. Polyurethane compositions thus stabilized are much more suitable for outdoor applications. In addition, some of the promoters (e.g., 2-benzyl-6-tert.-butyl-4-methylphenol, 2,6-diisopropyl-p-cresol, 2,4-dimethyl-6-tert.-butyl phenol and 4,4'-butylidene-bis(6-tert.-butyl-m-cresol) are non-discoloring; hence the initially colorless polyurethane compositions in which they are present in combination with the benzophenone compound undergo only slight discoloration after long exposure to ultraviolet radiation.

On account of the greatly improved stabilization afforded by the synergistic combination, much lower concentrations of the benzophenone compounds may be used to achieve satisfactory stabilization than if the benzophenone compound were present alone. For example, a polyurethane film containing 0.5% 2,2'-dihydroxy-4,4'-dimethoxybenzophenone and 0.5% 2-benzyl-6-tert.-butyl-4-methylphenol is stabilized as well as one containing 3% of the benzophenone compound with no promoter. This provides substantial cost savings. Furthermore, it is possible to protect polyurethane compositions which cannot tolerate high concentrations of benzophenones. When non-discoloring promoters are employed truly colorless compositions can now be obtained because the pale yellow benzophenone is at a much lower concentration in the polyurethane composition.

The stabilized polyurethane compositions may be prepared by several general procedures. The most convenient of these is to prepare an isocyanate-terminated polyurethane polymer from the reaction of a molar excess of one or more organic polyisocyanates with one or more organic polyols. The promoter and the benzophenone compound are then added to this polyurethane polymer and the polymer is then chain extended by means of water, an aliphatic polyol, an arylene diamine or hydrazine. For example, this chain extension can be effected by casting the isocyanate-terminated polyurethane polymer as a film or coating and exposing the same to atmospheric moisture over a period of time. In the preparation of molded articles the isocyanate-terminated polyurethane polymer containing the promoter and the substituted benzophenone may be chain extended by means of an aliphatic polyol or an arylene diamine. When elastomeric articles are prepared, the isocyanate-terminated polyurethane polymer may be chain extended to yield the ultimate polyurethane composition and the stabilizing combination of the promoter and the benzophenone then incorporated with the composition by means of milling. A fiber can be spun from a solution containing a hydrazine chain-extended polyurethane composition, the promoter and the benzophenone. When preparing linear high molecular weight polyurethane articles (such as fibers) it is preferred to complete the chain extension before introducing the promoter and the substituted benzophenone.

Generally, the promoter and the benzophenone are added to a fluid polyurethane polymer by conventional agitation. The mixture obtained is then chain extended by means of water, an aliphatic polyol or an arylene diamine. In dilute solution the polyurethane polymer may be chain extended with hydrazine. Alternatively, the stabilizing agents may be introduced after the chain extending agents have been added. This is preferred when hydrazine-extended polymers are made. When elastomeric stock is prepared, the unstabilized fluid polyurethane polymer may be incompletely chain extended to give a workable solid; the stabilizers may be incorporated by milling; chain extension is then completed by milling in hindered arylene diamines or aliphatic polyols and curing the compounded stock in a heated mold.

Representative examples of the promoters which may be used in this invention are: 2,2'-methylene-bis(6-tert.-butyl-4-methylphenol), 2,2'-methylene-bis(6-tert.-butyl-4-ethylphenol), 2,2'-methylene-bis(6-tert.-butyl-4-phenyl phenol), 2,2'-methylene-bis[4-methyl-6(1,1,3,3-tetramethyl butyl)phenol], 4,4'-butylidene-bis(6-tert.-butyl-m-cresol), 4,4'-bis(6-tert.-butyl-m-cresol)sulfide, 2,2'-methylene-bis(4,6-dimethylphenol), 2-tert.-butyl-4(4-tert.-butylphenyl)phenol, 2-tert.-butyl-4-phenylphenol, 2,6-dibenzyl-4-methylphenol, 2-benzyl-4-methylphenol, 2-benzyl-6-tert.-butyl-4-methylphenol, 2-benzyl-6-tert.-butyl-4-ethylphenol, 2,4-dimethyl-6(1-methyl-1-cyclohexyl)-phenol, 2,6-diisopropyl-4-methylphenol, 2,4-bis(1,1-dimethylpropyl)-phenol, 2,4-dimethyl-6-isopropylphenol, 2,4-dimethyl-6-tert.-butylphenol, 2,5-di-tert.-butyl-hydroquinone, phenothiazine, N,N'-di($\beta$-naphthyl)-p-phenylenediamine, and N-phenyl-$\beta$-naphthylamine.

Although many of the promoters are antioxidants (materials which, when added to rubber in small proportions, retard atmospheric oxidation or the effects of oxidation with rubber), some well known antioxidants such as 2,6-di-tert.-butyl-4-methylphenol and 2,2'-bis(6-tert.-butyl-4-methylphenol)sulfide are not operable.

In preparing the novel stabilized polyurethane compositions of this invention, from about 0.1 to 2.0 parts by weight of the promoter should be used for each 100 parts by weight of the polyurethane composition itself. It appears that the best results are obtained when the promoter and the benzophenone compound are present in equimolar amounts. It is to be understood that mixtures of two or more of the promoters may be used.

The 2,2'-dihydroxybenzophenones which are used in the novel compositions of this invention should be able to absorb strongly at substantially all wave lengths of ultraviolet light between about 3500 and 4000 A. units.

The compounds which are operable in this invention are the compounds represented by the formula

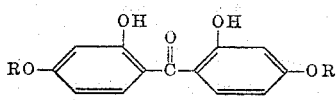

and

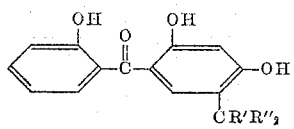

wherein R is hydrogen or lower alkyl, R' is hydrogen or lower alkyl and R" is lower alkyl. For every 100 parts by weight of the polyurethane composition, from about 0.1 to 3.0 parts by weight of the benzophenone should be used, with a preferred concentration ranging from about 0.5 to 1.0 part by weight. It is to be understood that mixtures of two or more benzophenone compounds may be used. Since these benzophenones do have a pale yellow color, it is recommended that when substantially colorless polyurethane films or coatings are desired, the concentration of the benzophenone compound not exceed about 1.0 part by weight for every 100 parts by weight of the polyurethane composition.

Various polymeric organic polyols may be used to prepare the polyurethane compositions, including polyalkyleneether glycols, polyalkyleneether-thioether glycols, polyalkylene-aryleneether glycols and polyesters which contain a plurality of hydroxyl groups. The useful polymeric polyol molecular weight depends on operating convenience and on the contemplated application of the polyurethane product. In general, the polymeric polyol molecular weight may range from about 400 to about 6000, with a preferred range of from about 400 to about 2000.

The polyalkyleneether glycols may be represented by the formula $HO(RO)_nH$, wherein R is an alkylene radical which need not necessarily be the same and $n$ is an integer. These glycols may be derived by the polymerization of cyclic ethers, such as alkylene oxides, or by the condensation of glycols. Representative examples of these glycols include polypropyleneether glycol, 1,2-polydimethylethyleneether glycol, ethylene oxide modified polypropyleneether glycol, polytrimethyleneether glycol, polytetramethyleneformal glycol, polytetramethyleneether glycol, polypentamethyleneether glycol, and polydecamethyleneether glycol. Polypropyleneether glycol and polytetramethyleneether glycol are preferred. For purposes of the present invention, a polytetramethyleneether glycol of molecular weight about 400 to 2000 is preferred.

The polyalkyleneether-thioether glycols may be represented by the formula $HO(QY)_nH$, wherein Q represents hydrocarbon radicals at least some of which are alkylene, Y represents chalcogen atoms some of which are sulfur, and $n$ is an integer. These glycols may be prepared by condensing together various glycols and thioglycols in the presence of a catalyst such as p-toluene sulfonic acid.

The polyalkylene-aryleneether glycols are similar to the polyalkyleneether glycols except that some of the alkylene radicals have been replaced by arylene radicals. In general, the phenylene and naphthalene radicals are preferred.

The polyesters containing a plurality of hydroxyl groups may be prepared by the usual methods of polymerization of cyclic lactones such as ε-caprolactone, or by the condensation-polymerization from a dicarboxylic acid and a molar excess of an organic diol and, if desired, a triol. Any of the well-known organic diols and dicarboxylic acids may be used in the preparation of these polyesters. The use of a polyol containing more than two hydroxyl groups results in a cross-linked polyester and this type of a compound is useful when preparing a polyurethane adhesive or coating composition. Representative examples of useful diols are ethylene glycol, propylene glycol, 1,3-propanediol, thiodiglycol, diethyleneglycol, and 1,2-alkylene oxide-modified glycols. Representative examples of useful polyhydric compounds are glycerol, trimethylolethane, 1,2,6-hexanetriol, and pentaerythritol. Representative examples of useful dicarboxylic acids are oxalic acid, malonic acid, succinic acid, adipic acid, suberic acid, azelaic acid, maleic acid, and phthalic acid; anhydrides of dicarboxylic acids may be employed, such as succinic anhydride and phthalic anhydride. The polyesters should be linear and their hydroxyl number should be between about 30 and 60 when elastic polyurethanes are made; optionally there may be about 1 crosslink for each 3000 to 12,000 molecular weight of polyester. The hydroxyl number may be as high as 300 to 500 and crosslinks as frequent as 1 per 300 molecular weight of polyester when polyurethane adhesives and plastic coatings are prepared.

It is to be understood that one or more polyols may be used in the preparation of the polyurethane compositions, such as a polymeric glycol, more particularly a polyalkyleneether glycol, and aliphatic diol having from about 2 to 8 carbon atoms, or an aliphatic triol having from about 3 to 6 carbon atoms.

In preparing the isocyanate-terminated polyurethane polymer, any of a wide variety of organic polyisocyanates may be used, either alone or as isomer mixtures or as mixtures of diisocyanates. Representative compounds include toluene-2,4-diisocyanate, 4-methoxy-1,3-phenylenediisocyanate, 4-isopropyl-1,3-phenylenediisocyanate, 4-ethoxy-1,3-phenylenediisocyanate, 2,4'-diisocyanatodiphenylether, 3,3-dimethyl-4,4'-diisocyanatodiphenylmethane, 1,5-naphthalenediisocyanate, mesitylene diisocyanate, durylene-diisocyanate, xylylene diisocyanate and hexamethylene diisocyanate. The preferred isomer mixture contains 80% toluene-2,4-diisocyanate and 20% toluene-2,6-diisocyanate. Triisocyanates such as toluene-2,4,6-triisocyanate and 2,4,4'-triisocyanatodiphenylether may be used to provide additional crosslinking.

The isocyanate-terminated polymers are prepared by reacting a molar excess of an organic polyisocyanate with an organic polyol under substantially anhydrous conditions. Agitation is normally employed to secure thorough mixing of the reactants and to aid in temperature control. About 1 to 2 hours is generally required to complete the reaction at 100° C. A correspondingly longer time is needed below 100° C., e.g., about 4 to 8 hours at 70° C. Optionally, the reaction can be carried out at temperatures above 100° C. to shorten the time required and to introduce additional crosslinking by side reactions such as allophanate formation (which becomes quite noticeable at about 140° C.). Optionally, the process may be carried out in more than one step. A hydroxyl-terminated polyurethane may be made by reacting the organic diisocyanate with a molar excess of the organic polyol. This polyurethane, in turn, may be reacted with a molar excess of an organic diisocyanate or an isocyanate-terminated polyurethane.

When the isocyanate-terminated polymer is a solid or a very viscous mass at or near room temperature, it may be prepared by dissolving the organic polyols in an inert solvent at room temperature and then adding the organic diisocyanate. After the initial heat of reaction has been given off, external heat is applied and the solution is stirred at a temperature of from about 50 to 120° C., or in some cases as high as 150° C., until substantially all of the hydroxyl groups have been reacted with isocyanate groups. This point can be determined by analysis for free isocyanate in the usual manner.

When solvents are employed in the preparation of the isocyanate-terminated polyurethane polymer, they must be non-reactive to isocyanate groups. Solutions up to about 70% concentration by weight may be prepared using volatile aromatic hydrocarbon solvents such as xylene and toluene. Volatile oxygen-containing solvents such as methyl ethyl ketone and ethyl acetate may be mixed with these aromatic solvents; mixed solvents of this sort are advantageous when the polyurethane concentration is higher than 50% by weight. The promoter and the benzophenone compound are dispersed in the solution of the isocyanate-terminated polyurethane polymer before it is applied as a coating on a substrate. After the solution is spread out on the surface, the solvent evaporates, and the moisture in the atmosphere cures the polyurethane to a homogeneous, continuous film by reaction with the isocyanate end groups to give urea links.

It is to be understood that various modifications may be made in the preparation of these polyurethane compositions depending on the ultimate use intended. Thus, it may be desirable to utilize an aliphatic diol or an aliphatic triol in the preparation of an isocyanate-terminated polyurethane polymer, particularly when this polymer is ultimately to be used as a coating composition.

After the isocyanate-terminated polyurethane polymer has been prepared and the promoter and benzophenone incorporated therewith, the polymer may then be chain extended by means of an active hydrogen-containing compound such as water, an aliphatic polyol, an arylene diamine or hydrazine. Since the chain extender must have active hydrogen atoms it is necessary that the arylene diamine be either primary or secondary. For preparing molded articles, it is convenient to chain extend these isocyanate-terminated compositions by introducing approximately a molar equivalent of an aliphatic polyol or an arylene diamine. Representative arylene diamines include 4,4'-methylene-bis(3-chloroaniline), 4,4'-methylene-bis(3-methylaniline), 4,4'-methylene-bis(3-methoxyaniline), mesitylene diamine, 1,5-naphthalenediamine, and m-phenylenediamine. Hydrazine is particularly useful for chain extension when fibers are made. Representative aliphatic polyols include 1,4-butanediol, 1,5-pentanediol, ethylene glycol, 1,2,6-hexanetriol, trimethylolpropane, trimethylolethane, ethylene oxide-modified trimethylolpropane, and ethylene oxide-modified pentaerythritol. For crosslinking, the polyol compound should have more than 2 hydroxyl groups.

The following examples will better illustrate the nature of the present invention; however, the invention is not intended to be limited to these examples. Parts are by weight unless otherwise indicated.

The tensile strength ($T_B$), extension at break ($E_B$), and modulus at 300% extension ($M_{300}$) are determined at 25° C. in accordance with ASTM procedure D412–51T.

The aging caused by exposure to ultraviolet light is carried out in a color fadeometer operated according to Tentative Test Method 16A–54 (1955 Technical Manual and Year Book of the American Association of Textile Chemists and Colorists, vol. XXXI, pp. 79–82).

PREPARATION OF ISOCYANATE-TERMINATED POLYURETHANE POLYMER A 278.7 parts of toluene-2,4-diisocyanate and 1000 parts of anhydrous polytetramethyleneether glycol (molecular weight 1000) are agitated at 80° C. for 4 hours in a dry reaction vessel protected from atmospheric moisture. Polymer A thus obtained has a free isocyanate content of 4.2%, a Brookfield viscosity at 30° C. of about 16,500 cps., and a number-average molecular weight of about 2000.

PREPARATION OF ISOCYANATE-TERMINATED POLYURETHANE POLYMER B 200 parts of polypropyleneether glycol of molecular weight 1000, 20.8 parts of 1,5-pentanediol, 53.6 parts of trimethylol propane and 238 parts of xylene are stirred together in a vessel with a reflux condenser. Then 283 parts of a mixture of 80% toluene-2,4-diisocyanate and 20% toluene-2,6-diisocyanate is added gradually while stirring, the temperature rising to 80° C. and being maintained there by adjusting the rate of addition of the diisocyanate. Stirring is continued at 80° C. after the addition of the diisocyanate is complete. A 70% solids solution of polymer B is thereby attained.

*Example 1*

A. To 100 parts of polymer A at 60–80° C. is added with stirring 1 part of 2-benzyl-6-tert.-butyl-4-methylphenol and 1 part of 2,2'-dihydroxy-4,4'-dimethoxybenzophenone. The molar ratio of phenol to benzophenone is 1:1. The mixture thus prepared is cast onto a flat glass surface and cured by exposure for a week to ambient atmospheric moisture vapor in the absence of direct sunlight. A tough, colorless, transparent film about 14 to 18 mils in thickness is obtained.

B. The procedure of part A above is repeated except that 2,2'-dihydroxy-4,4'-dimethoxybenzophenone is not added.

C. The procedure of part A above is repeated except that 2-benzyl-6-tert.-butyl-4-methylphenol is not added.

D. The films (A), (B), and (C) made by the procedures of parts A, B, and C above, respectively, are aged in a fadeometer for 80 exposure hours. Film (B) has deteriorated too severely for further testing. The aging of films (A) and (C) is continued. After a total of 120 exposure hours in the fadeometer, film (C) has deteriorated too markedly for further testing. Film (A) is aged further until a total of 210 exposure hours is accumulated. Film (A) has undergone very little discoloration. Table I–A, which follows, shows that the 2-benzyl-6-tert.-butyl-4-methylphenol alone gives very poor protection; 2,2'-dihydroxy-4,4'-dimethoxybenzophenone alone provides limited protection; but the combination of the two gives an exceptionally enhanced stability.

TABLE I–A

| Property | Fadeometer exposure, hours | 1% Promoter present | 1% benzophenone present | 1% Promoter plus 1% benzophenone present |
|---|---|---|---|---|
| $T_B$ | 0 | 6,100 | 5,950 | 6,330 |
| $E_B$ | 0 | 590 | 570 | 595 |
| $M_{300}$ | 0 | 1,190 | 1,150 | 1,220 |
| $T_B$ | 80 | 760 | 4,400 | 6,240 |
| $E_B$ | 80 | 190 | 770 | 720 |
| $M_{300}$ | 80 |  | 900 | 1,060 |
| $T_B$ | 120 |  | 700 | 5,350 |
| $E_B$ | 120 |  | 430 | 730 |
| $M_{300}$ | 120 |  | 640 | 980 |
| $T_B$ | 150 |  |  | 4,700 |
| $E_B$ | 150 |  |  | 800 |
| $M_{300}$ | 150 |  |  | 1,020 |
| $T_B$ | 180 |  |  | 5,050 |
| $E_B$ | 180 |  |  | 810 |
| $M_{300}$ | 180 |  |  | 980 |
| $T_B$ | 210 |  |  | 2,600 |
| $E_B$ | 210 |  |  | 810 |
| $M_{300}$ | 210 |  |  | 930 |

A control film containing no promoter or benzophenone has a tensile strength at break of 870 p.s.i. after only 10 exposure hours in the fadeometer.

E. The procedure of part A is repeated except that 0.5 part of 2,2'-dihydroxy-4,4'-dimethoxybenzophenone and 0.5 part of 2-benzyl-6-tert.-butyl-4-methylphenol is used.

F. The procedure of part E is repeated except that 2-benzyl-6-tert.-butyl-4-methylphenol is omitted.

G. The film prepared by the procedure of part E is aged in a fadeometer for periods of 80, 120 and 150 hours. The film prepared by the procedure of part F is aged in a fadeometer for 80 hours. Table I–B, which follows, shows that the synergistic combination provides a very greatly improved degree of protection.

TABLE I-B

| Property | Fadeometer exposure, hours | 0.5% Benzophenone present | 0.5% Benzophenone plus 0.5% promoter present |
|---|---|---|---|
| $T_B$ | 0 | 6,050 | 5,890 |
| $E_B$ | 0 | 560 | 580 |
| $M_{300}$ | 0 | 1,130 | 1,200 |
| $T_B$ | 80 | 2,950 | 6,000 |
| $E_B$ | 80 | 640 | 670 |
| $M_{300}$ | 80 | 750 | 1,120 |
| $T_B$ | 120 | ---------- | 4,500 |
| $E_B$ | 120 | ---------- | 730 |
| $M_{300}$ | 120 | ---------- | 1,000 |
| $T_B$ | 150 | ---------- | 4,500 |
| $E_B$ | 150 | ---------- | 820 |
| $M_{300}$ | 150 | ---------- | 910 |

H. The procedure of part A above is repeated except that 3 parts of 2,2'-dihydroxy-4,4'-dimethoxybenzophenone is employed instead of 1 part, and 2-benzyl-6-tert.-butyl-4-methylphenol is not added. The film obtained is aged for 150 exposure hours in a fadeometer. The data obtained indicate that the film is protected to about the same extent as that made by the procedure of part E above.

I. When the processes of parts A and D above are carried out using one of the following promoters in the amounts specified (mole ratio of phenol to benzophenone is 1:1) in place of 1 part of 2-benzyl-6-tert.-butyl-4-methylphenol, essentially the same results are obtained:

(1) 2,6-dibenzyl-4-methylphenol (1.05 part)
(2) 2,4 - dimethyl-6(1-methyl-1-cyclohexyl)phenol (0.8 part)
(3) 2-benzyl-4-methylphenol (0.72 part)
(4) 2,4-bis(1,1-dimethylpropyl)phenol (0.85 part)
(5) 2-tert.-butyl-4(4-tert.-butylphenyl)phenol (1.08 part)
(6) 2,5-di-tert.-butyl-hydroquinone (0.81 part)
(7) 2,2'-methylene - bis - [6-methyl-4-tert.-butylphenol] (1.24 parts)

J. When the processes of parts A and D above are carried out using one of the following phenolic compounds in the amounts specified (mole ratio of phenol to benzophenone is 1:1) in place of 1 part of 2-tert.-butyl-4-methyl-6-benzylphenol, no better protection is obtained than when the 2,2'-dihydroxy-4,4'-dimethoxybenzophenone is used alone. (See parts C, D above):

(1) 2-tert.-butyl-4-methylphenol (0.6 part)
(2) 2 - (1,1,3,3-tetramethylbutyl)-4-methylphenol (0.81 part)
(3) 2,4,6-trimethylphenol (0.5 part)
(4) 2,6-di-tert.-butyl-4-methylphenol (0.8 part)
(5) 2,6-diisopropylphenol (0.64 part)
(6) 4-phenylphenol (0.62 part)
(7) 2,6-di-tert.-butyl-4-phenylphenol (1.08 parts)
(8) 2,6-di-tert.-butyl-4(4-tert.-butylphenyl)phenol (1.25 parts)
(9) resorcinol (0.4 part)

K. 15 parts of titanium oxide is added to 100 parts of polymer A. Films made from this mixture by the procedures of parts A, B, and C above display stability toward ultraviolet light similar to that of the corresponding films (A), (B), and (C) above, which contain no titanium oxide, when tested by the procedure of part D.

*Example 2*

A. To 100 parts of polymer A at 60–80° C. is added with stirring 0.5 part of 2-benzyl-6-tert.-butyl-4-methylphenol and 1.0 part of 2,2'-dihydroxy-4,4'-dimethoxybenzophenone. The mixture thus prepared is heated to 80° C. and 11.8 parts of 4,4'-methylene-bis(3-chloroaniline) is introduced with agitation. The mixture is then poured into an open mold (the surface of which has been treated with a telomer of tetrafluoroethylene and carbon tetrachloride) and cured by heating at 140° C. for 1 hour. A strong, transparent film about 15 to 20 mils in thickness is obtained.

B. The procedure of part A above is repeated except that 2-benzyl-6-tert.-butyl-4-methylphenol is not added.

C. The films made by the procedure of parts A and B above are aged in a fadeometer for 80 and 120 hours (the aging of film A is continued to 150 and 180 hours).

Table II, which follows, shows that the combination of the benzophenone compound and the phenolic promoter provides far better protection than can be gained by using the benzophenone alone. After 180 exposure hours film A has only slightly discolored.

TABLE II

| Property | Fadeometer exposure, hours | 1% Benzophenone present | 0.5% promoter plus 1.0% benzophenone present |
|---|---|---|---|
| $T_B$ | 0 | 5,260 | 5,700 |
| $E_B$ | 0 | 410 | 420 |
| $M_{300}$ | 0 | 1,700 | 1,650 |
| $T_B$ | 80 | 3,950 | 5,050 |
| $E_B$ | 80 | 440 | 430 |
| $M_{300}$ | 80 | 1,400 | 1,550 |
| $T_B$ | 120 | 2,400 | 4,500 |
| $E_B$ | 120 | 420 | 470 |
| $M_{300}$ | 120 | 1,270 | 1,400 |
| $T_B$ | 150 | ---------- | 4,350 |
| $E_B$ | 150 | ---------- | 470 |
| $M_{300}$ | 150 | ---------- | 1,460 |
| $T_B$ | 180 | ---------- | 3,200 |
| $E_B$ | 180 | ---------- | 440 |
| $M_{300}$ | 180 | ---------- | 1,440 |

A control film containing no phenolic antioxidant or benzophenone compound is deeply yellowed and has a tensile strength at break of 1340 p.s.i. after only 10 exposure hours in the fadeometer.

*Example 3*

A. To 100 parts of polymer A at 60–80° C. is added with agitation 2.5 parts of 4,4'-butylidene-bis(6-tert.-butyl-m-cresol). The mixture thus prepared is cast onto a flat glass surface and subsequently cured by exposure for a week to ambient atmospheric moisture vapor in the absence of direct sunlight. A strong, colorless, transparent film 14 to 18 mils in thickness is obtained.

B. The procedure of part A above is repeated except that 1.0 part of 4,4'-dimethoxy-2,2'-dihydroxybenzophenone is used in place of 2.5 parts of 4,4'-butylidene-bis (6-tert.-butyl-m-cresol).

C. A control film is made following the procedure of part A above except that no 4,4'-butylidene-bis(6-tert.-butyl-m-cresol) is used.

D. The films prepared in parts A, B and C above are exposed in the fadeometer for 40 hours. The properties of the films afterward are as follows:

| Property | Fadeometer Exposure, Hours | Control | 1% Benzophenone Present | 2.5% Promoter Present |
|---|---|---|---|---|
| $T_B$ | 40 | 470 | 5,340 | 1,810 |
| $E_B$ | 40 | 100 | 700 | 810 |
| $M_{300}$ | 40 | ---------- | 1,000 | 550 |

E. To 100 parts of polymer A at 60–80° C. is added with agitation 1.0 part of 4,4'-dimethoxy-2,2'-dihydroxybenzophenone and 0.5 part of 4,4'-butylidene-bis(6-tert.-butyl-m-cresol). The mixture thus prepared is cast onto a flat glass surface and subsequently cured by exposure for a week to ambient atmospheric moisture vapor in the absence of direct sunlight. A clear, colorless film is obtained about 14 to 18 mils thick.

F. The film prepared in part E above is exposed in the fadeometer for 80 and 120 hours. Table III, which follows, compares the properties of this film with those of a film made by the procedure of Example 1–C and aged in a similar manner. The combination of the benzophenone and the promoter is far more effective than would be expected from the data given above in part D. After 120 exposure hours film E has only slightly discolored.

TABLE III

| Property | Fadeometer exposure, hours | 1% benzophenone present | 0.5% promoter plus 1.0% benzophenone present |
|---|---|---|---|
| $T_B$ | 0 | 5,950 | 5,850 |
| $E_B$ | 0 | 570 | 590 |
| $M_{300}$ | 0 | 1,150 | 1,100 |
| $T_B$ | 80 | 4,400 | 5,070 |
| $E_B$ | 80 | 770 | 820 |
| $M_{300}$ | 80 | 900 | 890 |
| $T_B$ | 120 | 700 | 5,700 |
| $E_B$ | 120 | 430 | 820 |
| $M_{300}$ | 120 | 640 | 940 |

*Example 4*

A. To 200 parts of a 50% solids solution in xylene of polymer B is added with stirring 1 part of 4,4'-dimethoxy-2,2'-dihydroxybenzophenone and 1 part of 2-benzyl-6-tert.-butyl-4-methylphenol. The solution thus prepared is cast onto a flat glass surface which has been treated with a tetrafluoroethylene/carbon tetrachloride telomer. The solvent is allowed to evaporate and the polyurethane composition is cured by exposure for 2 days to atmospheric moisture vapor in the absence of direct sunlight. A flexible, clear, colorless film about 4 mils thick is obtained.

B. The procedure of part A above is repeated except that 4,4'-dimethoxy-2,2'-dihydroxybenzophenone and 2-benzyl-6-tert.-butyl-4-methylphenol are not employed. A flexible, transparent, colorless film about 4 mils thick is obtained.

C. The films prepared in parts A and B above are exposed for 150 and 300-hour periods in the fadeometer. Film B cracks on flexing after 150 exposure hours. The stabilized film A does not crack when flexed until after 300 exposure hours.

*Example 5*

A. The procedure of part A of Example 1 is repeated except that 2,2',4,4'-tetrahydroxybenzophenone is substituted for 2,2'-dihydroxy-4,4'-dimethoxybenzophenone.

B. The procedure of part A above is repeated except that 2-benzyl-6-tert.-butyl-4-methylphenol is not added.

C. The film made by the procedure of part A above is aged in a fadeometer for 150, 180 and 210 exposure hour periods. The film made by the procedure of part B above is aged for 80 and 120 exposure hour periods. By then the film has deteriorated so that aging is discontinued. The results are shown in Table V, which follows. The data for the film containing 1% promoter are taken from parts B and D of Example 1.

TABLE V

| Property | Fadeometer exposure, hours | 1% promoter present | 1% benzophenone present | 1% promoter plus 1% benzophenone present |
|---|---|---|---|---|
| $T_B$ | 0 | 6,100 | 6,050 | 5,900 |
| $E_B$ | 0 | 590 | 560 | 520 |
| $M_{300}$ | 0 | 1,190 | 1,250 | 1,150 |
| $T_B$ | 80 | 760 | 4,800 | |
| $E_B$ | 80 | 190 | 840 | |
| $M_{300}$ | 80 | | 850 | |
| $T_B$ | 120 | | 2,300 | |
| $E_B$ | 120 | | 890 | |
| $M_{300}$ | 120 | | 725 | |
| $T_B$ | 150 | | | 6,000 |
| $E_B$ | 150 | | | 760 |
| $M_{300}$ | 150 | | | 885 |
| $T_B$ | 180 | | | 3,900 |
| $E_B$ | 180 | | | 750 |
| $M_{300}$ | 180 | | | 920 |
| $T_B$ | 210 | | | 3,400 |
| $E_B$ | 210 | | | 820 |
| $M_{300}$ | 210 | | | 880 |

*Example 6*

A. To 100 parts of polymer A at 60-80° C. are added with agitation 1.0 part of 2,2'-dihydroxy-4,4'-dimethoxybenzophenone and 1.0 part of 4,4'-butylidenebis(6-tert.-butyl-m-cresol). The mixture thus prepared is cast onto a flat glass surface and subsequently cured by exposure for a week to ambient atmospheric moisture vapor in the absence of direct sunlight. A clear, colorless film is obtained about 14-18 mils thick.

B. The procedure of part A above is repeated except that the phenolic promoter is omitted.

C. The films prepared by the procedures of parts A and B above are exposed outdoors to direct sunlight and ambient atmospheric conditions in the vicinity of Deepwater, New Jersey, for a period of 80 days during summertime. Table VI, which follows, shows that the film containing the synergistic combination withstands outdoor aging much better than the film protected by the benzophenone compound alone.

TABLE VI

| Property | Exposure time (days) | 1% benzophenone present | 1% promoter plus 1% benzophenone present |
|---|---|---|---|
| $T_B$ | 0 | 5,950 | 5,890 |
| $E_B$ | 0 | 550 | 590 |
| $M_{300}$ | 0 | 1,250 | 1,150 |
| $T_B$ | 80 | 620 | 2,950 |
| $E_B$ | 80 | 240 | 730 |
| $M_{300}$ | 80 | | 1,060 |

*Example 7*

A. The procedure of part A of Example 6 is repeated except that 2,2'-methylene-bis(6-tert.-butyl-4-ethylphenol) is substituted for 4,4'-butylidenebis(6-tert.-butyl-m-cresol).

B. The procedure of part A above is repeated except that the benzophenone compound is omitted.

C. The film made by the procedure of part A above is aged in a fadeometer for 150, 210 and 260 exposure hour periods. The film made by the procedure of part B above is aged for 80 and 120 exposure hour periods. By then the film has deteriorated so that aging is discontinued. The results are shown in Table VII which follows. The data for the film containing 1% benzophenone compound are taken from Example 1.

TABLE VII

| Property | Fadeometer exposure, hours | 1% Promoter present | 1% benzophenone present | 1% promoter plus 1% benzophenone present |
|---|---|---|---|---|
| $T_B$ | 0 | 6,320 | 5,950 | 6,180 |
| $E_B$ | 0 | 590 | 570 | 550 |
| $M_{300}$ | 0 | 1,350 | 1,150 | 1,210 |
| $T_B$ | 80 | 2,000 | 4,400 | |
| $E_B$ | 80 | 520 | 770 | |
| $M_{300}$ | 80 | 1,260 | 900 | |
| $T_B$ | 120 | 850 | 700 | |
| $E_B$ | 120 | 270 | 430 | |
| $M_{300}$ | 120 | | 640 | |
| $T_B$ | 150 | | | 5,500 |
| $E_B$ | 150 | | | 700 |
| $M_{300}$ | 150 | | | 1,040 |
| $T_B$ | 210 | | | 5,700 |
| $E_B$ | 210 | | | 700 |
| $M_{300}$ | 210 | | | 1,000 |
| $T_B$ | 260 | | | 4,500 |
| $E_B$ | 260 | | | 680 |
| $M_{300}$ | 260 | | | 970 |

D. When 2,2'-methylene-bis(6-tert.-butyl-4-methylphenol) is substituted for 2,2'-methylene-bis(6-tert.-butyl-4-ethylphenol) in the procedure of parts A and B above, essentially the same results are obtained.

E. When 2,2'-methylene-bis[4-methyl-6-(1,1,3,3-tetramethyl)butyl-phenol] is substituted for 2,2'-methylenebis(6-tert.-butyl-4-ethylphenol) in the procedure of parts A and B above, essentially the same results are obtained.

*Example 8*

A. To 100 parts of polymer A at 60–80° C. are added with agitation 1.0 part of 2,2'-dihydroxy-4,4'-dimethoxy-benzophenone and 1.0 part of N-phenyl-β-naphthylamine. The mixture thus prepared is cast onto a flat surface and subsequently cured by exposure for a week to ambient moisture vapor in the absence of direct sunlight. A clear film is obtained about 14–18 mils thick.

B. The procedure of part A above is repeated except that the benzophenone compound is omitted.

C. The film made by the procedure of part A above is aged in a fadeometer for 80, 180 and 240 exposure hour periods. The film made by the procedure of part B above is aged for 40 and 80 exposure hour periods. By then the film has degraded so badly that no further aging is carried out. The results are shown in Table VIII which follows. The data for the film containing only 1% 2,2'-dihydroxy-4,4'-dimethoxy-benzophenone are taken from Example 1.

TABLE VIII

| Property | Fadeometer exposure, hours | 1% Promoter present | 1% benzophenone present | 1% promoter plus 1% benzophenone present |
|---|---|---|---|---|
| T_B | 0 | 5,900 | 5,950 | 6,250 |
| E_B | 0 | 600 | 570 | 580 |
| M_300 | 0 | 1,320 | 1,150 | 1,210 |
| T_B | 40 | 4,400 | | |
| E_B | 40 | 650 | | |
| M_300 | 40 | 1,150 | | |
| T_B | 80 | 1,200 | 4,400 | 5,000 |
| E_B | 80 | 560 | 770 | 760 |
| M_300 | 80 | 920 | 900 | 980 |
| T_B | 180 | | 700 | 4,400 |
| E_B | 180 | | 430 | 720 |
| M_300 | 180 | | 640 | 960 |
| T_B | 240 | | | 3,400 |
| E_B | 240 | | | 790 |
| M_300 | 240 | | | 950 |

D. When N,N'-dibeta-naphthyl-p-phenylenediamine is substituted for N-phenyl-β-naphthylamine in the procedures of parts A and C above, essentially the same results are obtained.

*Example 9*

A. The procedure of part A of Example 1 is repeated except that 0.4 part of hydroquinone is substituted for 1 part of 6-benzyl-2-tert.-butyl-4-methylphenol. The molar ratio of hydroquinone to benzophenone is 1:1.

When the polyurethane film thus prepared is aged in a fadeometer, about 170 exposure hours elapse before the tensile strength of the film has decreased to half its original value.

B. When the process of part A above is carried out using one of the following phenolic compounds in place of the 0.4 part of hydroquinone (the mole ratio of phenol to benzophenone is 1:1) essentially the same results are obtained:

(1) 2,2'-methylene-bis(4,6-dimethylphenol)
(2) 4,4'-butylidene-bis(6-tert.-butyl-m-cresol)
(3) 4,4'-bis(6-tert.-butyl-3-methylphenol)sulfide
(4) 2,2'-methylene-bis(6-tert.-butyl-4-phenylphenol)

C. When the process of part A above is carried out using 0.36 part of phenothiazine in place of the 0.4 part of hydroquinone (the mole ratio of phenothiazine to benzophenone is 1:1), essentially the same results are obtained.

D. When the process of part A above is carried out using 1.3 part of 2,2'-bis(6-tert.-butyl-4-methylphenol) sulfide in place of the 0.4 part of hydroquinone (the mole ratio of sulfide to benzophenone is 1:1), the film obtained is protected no better than one containing only 1 part of the benzophenone (see Example 1, parts C and D).

*Example 10*

92 parts of polytetramethylene ether glycol (0.092 mole) of molecular weight 1000 are reacted with 8 parts (0.046 mole) of toluene-2,4-diisocyanate under an atmosphere of nitrogen for 3 hours at 80° C. The product of this reaction in which polytetramethylene ether glycol chains are coupled one or more times by diisocyanate molecules, is called "dimer." 40 parts of the dimer (0.02 mole) are reacted with 10 parts (0.04 mole) of bis-(4-isocyanatophenyl) methane for one hour at 80° C. and diluted with 25 parts of dimethylformamide. The product of this reaction, in which terminal isocyanate groups are placed at the end of each dimer molecule, is called "capped dimer." 15 parts of the diluted capped dimer is "chain extended" by pouring into 0.165 part (0.0033 mole) of hydrazine hydrate in 30 parts of dimethylformamide. The solution of elastomeric polymer so produced contains approximately 19% solids, is of 500 poises viscosity at 30° C., and has an inherent viscosity in hexamethyl phosphoramide of 1.5. To 7 parts of this solution are added 0.0132 part of 2,2',4,4'-tetrahydroxybenzophenone and 0.0132 part of 4,4'-butylidene-bis(6-tert.-butyl-m-cresol) dispersed in 38.1 parts of dimethylformamide. This solution is heated to 60° C. and extruded into a co-current stream of 250° C. air as a 15-filament yarn. The time between heating and extrusion of this solution is held to less than one minute. During passage through a 17-foot dry spinning column the filaments are allowed to come into contact and coalesce to give a monofilament of about 200 denier. On emergence from the dry spinning column the monofilament is coated with talc to prevent sticking on the spinning package and is wound up at 300 yarns per minute. The talc is removed by a 30 minute boil-off in water prior to testing. Fibers prepared in this way contain 1.0% of the 2,2',4,4'-tetrahydroxybenzophenone and 1.0% of the 4,4'-butylidene-bis(6-tert.-butyl-m-cresol). Samples are prepared for exposure to ultraviolet light by winding on a 3 x 7 inch aluminum plate. Another sample of fibers is prepared similarly from a polymer solution to which no stabilizers have been added.

The effects of exposing the two samples to ultraviolet light in the fadeometer are presented in the following table.

TABLE IX

| Property | Fadeometer exposure, hours | No stabilizers present | 1% promoter plus 1% benzophenone present |
|---|---|---|---|
| T | 0 | 1.10 | 0.80 |
| E | 0 | 633 | 584 |
| M | 0 | 0.11 | 0.10 |
| T | 32 | 0.29 | |
| E | 32 | 476 | |
| M | 32 | 0.11 | |
| T | 96 | | 0.47 |
| E | 96 | | 539 |
| M | 96 | | 0.10 |

In the above table T represents the tenacity in units of grams per denier, E represents the elongation at break in percentage, M represents the modulus in grams per denier at 200% elongation.

*Example 11*

A. To 100 parts of polymer A at 60–80° C. are added with agitation 1.0 part of 2,2'-dihydroxy-4,4'-dimethoxy-benzophenone, 1.0 part of 6-benzyl-2-tert.-butyl-4-methylphenol, 3.5 parts of 1,4-butanediol, and 1.0 part of trimethylolpropane. The mole ratio of phenol to benzophenone is 1:1. The mixture thus prepared is cast in an open mold which is subsequently heated for 4 hours at 140° C. A tough clear film about 14 to 18 mils in thickness is obtained.

B. The procedure of part A above is repeated except that 2,2'-dihydroxy-4,4'-dimethoxybenzophenone is not added.

C. The procedure of part A above is repeated except that 6-benzyl-2-tert.-butyl-4-methylphenol is not added.

D. The procedure of part A above is repeated except that neither the phenol nor the benzophenone is added.

E. The films (A), (B), (C) and (D) made by the procedures of parts A, B, C and D above, respectively, are aged in a fadeometer for 20 exposure hours. Film (D) has deteriorated too severely for further testing. The aging of films (A) (B), and (C) is continued. After a total of 40 exposure hours in the fadeometer, film (B) has been degraded too markedly for additional testing. The aging of films (A) and (C) is continued. After a total of 120 exposure hours film (C) has suffered too great a loss in tensile strength to justify further exposure. Aging of film (A) is continued until a total of 240 exposure hours has been accumulated. The table which follows shows the data obtained.

TABLE X

| Property | Fadeometer exposure, hours | Film (A) | Film (C) | Film (B) | Film (D) |
|---|---|---|---|---|---|
| $T_B$ | 0 | 2,600 | 2,400 | 3,200 | 2,500 |
| $E_B$ | 0 | 540 | 600 | 540 | 620 |
| $M_{300}$ | 0 | 400 | 290 | 420 | 325 |
| $T_B$ | 20 | | | 3,100 | 350 |
| $E_R$ | 20 | | | 560 | 430 |
| $M_{300}$ | 20 | | | 370 | 225 |
| $T_B$ | 40 | | | 300 | |
| $E_B$ | 40 | | | 340 | |
| $M_{300}$ | 40 | | | 230 | |
| $T_B$ | 100 | | 2,000 | | |
| $E_B$ | 100 | | 600 | | |
| $M_{300}$ | 100 | | 275 | | |
| $T_B$ | 120 | | 1,420 | | |
| $E_B$ | 120 | | 600 | | |
| $M_{300}$ | 120 | | 255 | | |
| $T_B$ | 160 | 2,500 | | | |
| $E_B$ | 160 | 530 | | | |
| $M_{300}$ | 160 | 380 | | | |
| $T_B$ | 200 | 2,750 | | | |
| $E_B$ | 200 | 570 | | | |
| $M_{200}$ | 200 | 330 | | | |
| $T_B$ | 240 | 600 | | | |
| $E_B$ | 240 | 400 | | | |
| $M_{300}$ | 240 | 400 | | | |

*Example 12*

A. A hydroxyl-terminated polyester having a molecular weight of 1090 is prepared by agitating 199 parts of epsilon-caprolactone with 12 parts of ethylene glycol (molar ratio of lactone to glycol is 9:1) for 20 hours at 170° C.

B. Polymer C, a fluid polyesterpolyurethane having a 3.8% free isocyanate content, is prepared by agitating 83 parts of the polyester (prepared in part A above) and 20.3 parts of toluene-2,4-diisocyanate at 80° C. for 2 hours in a dry reaction vessel protected from atmospheric moisture.

C. The procedures of parts A, B, C and D of Example 1 are repeated except that polymer C is substituted for polymer A. Essentially the same results are obtained.

*Example 13*

A. 104 parts of mesitylene diisocyanate and 300 parts of polytetramethyleneether glycol (molecular weight 1000) are agitated at 80° C. for 4 hours in a dry reaction vessel protected from atmospheric moisture. Polymer D thus obtained has a free isocyanate content of about 4.5%.

B. The procedures of parts A, B and C of Example 1 above are repeated except that polymer D is substituted for polymer A. In addition to films (A), (B) and (C) thus prepared, a control film (D) is made which contains neither the benzophenone compound nor the promoter.

C. Films (A), (B), (C) and (D) made by the procedure of part B above are aged in a fadeometer. The control film (D) is so severely degraded after 15 exposure hours that its testing is discontinued. Film (C) containing the promoter is too weak for testing after 20 exposure hours. Film (B) containing the benzophenone displays less than 20% of its initial tensile strength after 40 exposure hours. Film (A) containing the synergistic combination retains at least 80% of its initial tensile strength for 70 exposure hours, at least 35% for 80 exposure hours.

*Example 14*

Films (A) and (C) are made by repeating the procedures of parts A and C of Example 1 above except that 5-tert.-butyl-2,2',4-trihydroxybenzophenone is substituted for 2,2'-dihydroxy-4,4'-dimethoxybenzophenone. The films are then aged in a fadeometer. After 260 exposure hours the tensile strength of film (C) has decreased about 50% of its initial value and testing is stopped. Film (A) containing the synergistic combination still retains over 90% of its initial tensile strength after 320 exposure hours, over 50% after 380 exposure hours, and over 25% after 400 exposure hours. The data obtained are given in Table XI below. The data for the film containing 1% promoter is taken from part D of Example 1.

TABLE XI

| Property | Fadeometer exposure, hours | 1% Promoter present | 1% benzophenone present | 1% promoter plus 1% benzophenone present |
|---|---|---|---|---|
| $T_B$ | 0 | 6,100 | 5,850 | 6,250 |
| $E_B$ | 0 | 590 | 520 | 540 |
| $M_{300}$ | 0 | 1,190 | 1,140 | 850 |
| $T_B$ | 80 | 760 | | |
| $E_B$ | 80 | 190 | | |
| $M_{300}$ | 80 | | | |
| $T_B$ | 120 | | 6,900 | 5,000 |
| $E_B$ | 120 | | 620 | 580 |
| $M_{300}$ | 120 | | 1,050 | 750 |
| $T_B$ | 150 | | 5,800 | 7,300 |
| $E_B$ | 150 | | 670 | 600 |
| $M_{300}$ | 150 | | 850 | 850 |
| $T_D$ | 160 | | 6,800 | |
| $E_B$ | 160 | | 640 | |
| $M_{300}$ | 160 | | 1,010 | |
| $T_B$ | 180 | | | 7,000 |
| $E_B$ | 180 | | | 630 |
| $M_{300}$ | 180 | | | 700 |
| $T_B$ | 200 | | 5,500 | |
| $E_B$ | 200 | | 710 | |
| $M_{300}$ | 200 | | 910 | |
| $T_B$ | 220 | | 4,150 | |
| $E_B$ | 220 | | 752 | |
| $M_{300}$ | 220 | | 850 | |
| $T_B$ | 235 | | | 6,800 |
| $E_B$ | 235 | | | 620 |
| $M_{300}$ | 235 | | | 750 |
| $T_B$ | 260 | | 3,050 | |
| $E_B$ | 260 | | 800 | |
| $M_{300}$ | 260 | | 700 | |
| $T_B$ | 320 | | | 6,000 |
| $E_B$ | 320 | | | 630 |
| $M_{300}$ | 320 | | | 800 |
| $T_B$ | 360 | | | 4,600 |
| $E_B$ | 360 | | | 790 |
| $M_{300}$ | 360 | | | 850 |
| $T_B$ | 380 | | | 3,340 |
| $E_B$ | 380 | | | 610 |
| $M_{300}$ | 380 | | | 760 |
| $T_B$ | 400 | | | 2,600 |
| $E_B$ | 400 | | | 800 |
| $M_{300}$ | 400 | | | 620 |

*Example 15*

A. To 100 parts of polymer A at 60–80° C. is added with stirring 1 part of 2,2'-dihydroxy-4,4'-dimethoxybenzophenone and 0.7 part of 2,6-diisopropyl-p-cresol. The molar ratio of benzophenone to cresol is 1:1. The mixture thus prepared is cast onto a flat glass surface and cured by exposure for a week to ambient atmospheric moisture vapor in the absence of direct sunlight. A tough, colorless, transparent film about 14 to 18 mils in thickness is obtained. Table XII below gives the data obtained when this film is aged in a fadeometer.

B. When the procedure of part A above is carried out using one of the following promoters in the amounts specified (mole ratio of phenol to benzophenone is 1:1)

in place of 0.7 part of 2,6-diisopropyl-p-cresol, essentially the same results are obtained:

(1) 2-tert.-butyl-4,6-dimethylphenol (0.65 part)
(2) 2-isopropyl-4,6-dimethylphenol (0.6 part)
(3) 2-tert.-butyl-6-isopropyl-4-methylphenol (0.75 part)

TABLE XII

| Exposure, hours | $T_B$ | $E_B$ | $M_{300}$ |
|---|---|---|---|
| 0 | 6,000 | 540 | 1,250 |
| 120 | 5,400 | 580 | 1,265 |
| 150 | 6,850 | 600 | 1,240 |
| 180 | 5,100 | 640 | 1,300 |
| 210 | 5,000 | 660 | 1,090 |
| 240 | 3,900 | 650 | 1,070 |
| 280 | 3,800 | 670 | 930 |
| 320 | 2,500 | 690 | 850 |

It is quite apparent from the foregoing examples that the use of a promoter and a benzophenone ultraviolet light absorber compound brings about a significant stabilization of a polyurethane composition. Any polyurethane composition stabilized in this manner is particularly useful in applications where ability to withstand exposure to sunlight is important, such as in the field of fibers, filaments and coatings. Fluid isocyanate-terminated polyurethane compositions (such as polymer A) to which the protective combination and arylene diamine chain extending agents have been added, are valuable as non-shrinking caulking compounds and for coating fabrics. They can be cast and molded to make gaskets and automotive rubber parts. They can be blended with epoxy resins for the encapsulation and potting of electronic equipment. Solutions in volatile inert solvents of isocyanate-terminated polyurethane compositions such as polymer B to which the protective combination has been added are suitable for applying clear, glossy finishes. Coatings of this type are tough, hard, abrasion resistant, and flexible. They may be used to advantage in finishing floors and furniture because of their outstanding resistance to chipping. They are very suitable for finishing natural wood for exterior applications, including marine service.

As many widely different embodiments of this invention may be made without departing from the spirit and scope thereof, it is to be understood that this invention is not limited to the specific embodiments thereof except as defined in the appended claims.

What is claimed is:

1. A polyurethane composition having incorporated therein: (1) from about 0.1 to 3.0% by weight of a 2,2'-dihydroxybenzophenone selected from the group consisting of

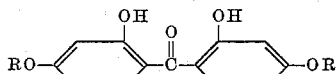

and

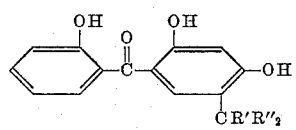

wherein R is selected from the group consisting of hydrogen and a lower alkyl radical, R' is selected from the group consisting of hydrogen and a lower alkyl radical and R'' is a lower alkyl radical, and (2) from about 0.1 to 2.0% by weight of a promoter selected from the group consisting of (a)

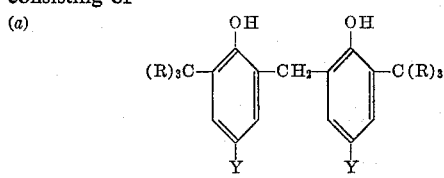

wherein R is selected from the group consisting of hydrogen and a lower alkyl radical and Y is selected from the group consisting of a lower alkyl radical and a phenyl radical;

(b)

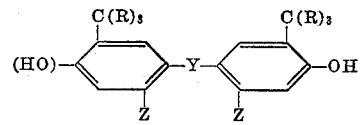

wherein R is a lower alkyl radical, Y is selected from the group consisting of a —S— radical and a lower alkylene radical having the structure

wherein R' is selected from the group consisting of hydrogen and lower alkyl radical, and Z is selected from the group consisting of hydrogen and a lower alkyl radical of no more than 2 carbon atoms;

(c)

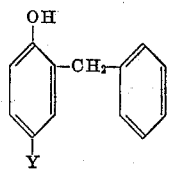

wherein Y is selected from the group consisting of a lower alkyl radical, a phenyl radical and a lower alkyl substituted phenyl radical;

(d)

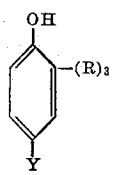

wherein R is a lower alkyl radical and Y is selected from the group consisting of a phenyl radical, a lower alkyl substituted phenyl radical and a —C(R')₃ radical wherein R' is lower alkyl;

(e)

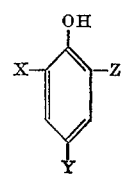

wherein X is selected from the group consisting of a benzyl radical and a

radical wherein R', R'' and R''' are selected from the group consisting of hydrogen and a lower alkyl radical with the proviso that R' and R'' may be alkylene radicals which are joined to form a 5- or 6-membered ring; Y is selected from the group consisting of a phenyl radical and a lower alkyl radical of no more than 2 carbon atoms and Z is selected from the group consisting of a benzyl radical and a

wherein Q' and Q'' are selected from the group consisting of hydrogen and a lower alkyl radical, with the proviso that R", R'" and Q' can not all be hydrogen in the same compound;

(f)
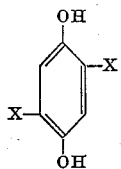

wherein X is selected from the group consisting of hydrogen and a lower alkyl radical;

(g)
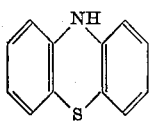

(h)
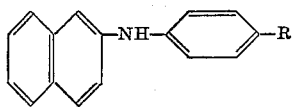

wherein R is selected from the group consisting of hydrogen and a

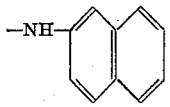

radical.

2. A polyurethane composition according to claim 1 wherein the polyurethane is prepared from an organic polyol, a molar excess of an organic polyisocyanate with respect to said polyol and a chain extending agent selected from the group consisting of water, aliphatic polyols, arylene diamines and hydrazine.

3. A polyurethane composition according to claim 1 wherein the polyurethane is prepared from a polytetramethyleneether glycol having a molecular weight of from about 400 to 2000, a molar excess of toluene-2,4-diisocyanate with respect to said glycol and water.

4. A polyurethane composition according to claim 1 wherein the polyurethane is prepared from a polypropyleneether glycol having a molecular weight of from about 400 to 2000, 1,5-pentanediol, trimethylolpropane, a molar excess of a mixture of 2,4- and 2,6-isomers of toluenediisocyante with respect to said polyols, and water.

5. A polyurethane composition according to claim 1 wherein the promoter is 2-benzyl-6-tert.-butyl-4-methylphenol.

6. A polyurethane composition according to claim 1 wherein the promoter is 2,2'-methylene-bis(6-tert.-butyl-4-methylphenol).

7. A polyurethane composition according to claim 1 wherein the promoter is 2-tert.-butyl-4,6-dimethylphenol.

8. A polyurethane composition according to claim 1 wherein the promoter is 2,6-diisopropyl-4-methylphenol.

9. The composition of claim 1 in the form of a fiber.

10. The composition of claim 1 in the form of a film.

References Cited in the file of this patent

UNITED STATES PATENTS

| | | |
|---|---|---|
| 2,693,492 | Hoch | Nov. 2, 1954 |
| 2,875,174 | Webb | Feb. 24, 1959 |
| 2,915,496 | Swart | Dec. 1, 1959 |

FOREIGN PATENTS

| | | |
|---|---|---|
| 580,524 | Great Britain | Sept. 11, 1946 |

UNITED STATES PATENT OFFICE
CERTIFICATE OF CORRECTION

Patent No. 2,984,645                          May 16, 1961

Guenther K. Hoeschele

It is hereby certified that error appears in the above numbered patent requiring correction and that the said Letters Patent should read as corrected below.

Column 6, line 24, after "and" insert -- an --; column 18, lines 32 to 39, the formula should appear as shown below instead of as in the patent:

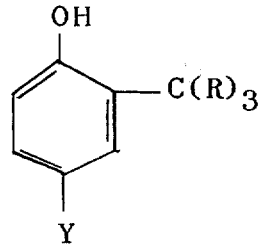

(SEAL)      Signed and sealed this 10th day of October 1961.
Attest:

ERNEST W. SWIDER                          DAVID L. LADD
Attesting Officer                           Commissioner of Patents